United States Patent [19]

Steinbock

[11] Patent Number: 5,075,950

[45] Date of Patent: Dec. 31, 1991

[54] METHOD FOR LOOSENING JACK BOLTS

[76] Inventor: Rolf H. Steinbock, 128 Grienbrier Dr., Carnegie, Pa. 15106

[21] Appl. No.: 545,208

[22] Filed: Jun. 28, 1990

[51] Int. Cl.$^5$ .............................................. B23P 19/04
[52] U.S. Cl. .................................... 29/426.5; 29/446; 29/525.2
[58] Field of Search ............. 29/252, 256, 446, 426.5, 29/525.2; 403/31, 320; 411/395, 434, 916, 432, 433

[56]  References Cited

U.S. PATENT DOCUMENTS

| | | | |
|---|---|---|---|
| 3,835,523 | 9/1974 | Stansfield | 411/395 |
| 3,841,193 | 10/1974 | Ito | 411/916 X |
| 3,886,707 | 6/1975 | Heldt | 403/31 X |
| 4,075,923 | 2/1978 | Latham | 29/446 X |
| 4,182,215 | 1/1980 | Green et al. | 411/434 |
| 4,288,898 | 9/1981 | Adcock | 29/252 X |
| 4,338,037 | 7/1982 | Deminski | 403/320 X |
| 4,540,199 | 9/1985 | Neill | 29/256 X |
| 4,622,730 | 11/1986 | Steinbock | 403/320 X |

Primary Examiner—Joseph M. Gorski
Assistant Examiner—Peter Dungba Vo
Attorney, Agent, or Firm—Clifford A. Poff

[57] ABSTRACT

A multiple jack bolt assembly, wherein a tensioner body component of the assembly, which may take the form of a nut, bolt, thrust collar, and the like, is provided in addition to its plurality of standard jack bolt holes with at least one additional drilled and tapped release hole for receiving a corresponding plurality of release jack bolts. The additional jack bolt hole or holes preferably remain empty during installation and the load cycle of the jack bolt system and it is also preferred that they and the release jack bolts received therein vary in construction from the standard jack bolt holes and jack bolts. When it is desired to remove the multiple jack bolt tensioning device, the release jack bolt holes are first cleaned (if necessary) and lubricated. The release jack bolts are then lubricated, threaded into the release jack bolt holes until their thrust ends contact a hardened washer memory, which is also contacted by the thrust ends of the plurality of standard jack bolts, and is then torqued to an amount at least equal to the installation torque of the immediately adjacent standard jack bolts, thereby relieving the loads thereof. With the release jack bolts in this position, the adjacent jack bolts are broken loose, as well as the remaining standard jack bolts, whereupon the tensioner body component may be released.

4 Claims, 3 Drawing Sheets

METHOD FOR LOOSENING JACK BOLTS

BACKGROUND OF THE INVENTION

1. Field of the Invention

The present invention generally relates to apparatus for stressing a shank part of member or such as a bolt, shaft, or stud, and, in particular, to method and apparatus for facilitating loosening of multiple jack bolt tensioning devices that may be seized due to prolonged exposure to high temperature and/or corrosive atmosphere.

2. Description of the Prior Art

It is a common practice for workmen to stress a bolt by applying torque to the bolt head to advance a threaded portion along threads in a tapped hole or a nut member so that the shank portion of the bolt is placed under a desired or predetermined mechanical stress. The stress imparted to the shank portion of the bolt can be determined by using a torque wrench to measure the torque applied to the bolt or by using other means to measure the applied force by a spanner wrench. The torque may be applied to the head portion of the bolt or to the nut. A stud can be stressed in a similar way by torque applied to a nut engaged with a threaded portion of the stud. The present invention is designed to permit stressing of a large fastener, e.g., a bolt or a stud, having a diameter generally one inch or larger. The magnitude of stress that can be applied to a bolt, stud or similar fastener has limits of practicality, particularly with respect to workmen. For example, a one-inch diameter threaded bolt made of high-strength material can be tightened by the use of a spanner wrench to the elastic limit of the material With coarse threads, a stress to the elastic limit of the material requires about 1000 ft-lb of torque, e.g., 100 pounds of force applied by a 10 foot lever. Under ordinary conditions, this exceeds both the practical length of the lever and the amount of force a workman can deliver to the lever. Similarly, under usual conditions, a workman using a spanner wrench cannot stress the shank of a nut and bolt assembly that is four inches in diameter and having coarse threads to 57,000 ft-lb which is the required torque to stress the bolt to the elastic limit of a typical material comprising the nut and bolt. To develop torque of this magnitude, 5700 pounds of force must be applied to a 10-foot long lever which cannot be accomplished without employing massive machinery or special facilities.

A number of varied methods and apparatus for imparting elevated tensile stresses to shaft members are known. These include, inter alia, thermal shrinkage, hydraulically-powered devices and mechanically operated devices.

Thermal shrinkage is an old method for stressing a bolt. The bolt is first heated to elongate its shank. The bolt is then torqued to a precalculated stress and finally is allowed to cool so that upon cooling, thermal shrinkage tensions the bolt. Usually, this method cannot be used where the amount of stress must be accurately controlled or precisely established. It is also difficult to unscrew the bolt from the threaded member without reheating the bolt.

Hydraulically-operated shaft tensioning devices, due to inherent physical constraints, are limited in their application to usage only in low-to-moderate temperature environments and in instances wherein only moderate tensioning of the shaft is required. This is because the hydraulic seals in such devices are incapable of maintaining their structural integrity beyond comparatively restricted levels of temperature and/or pressure Hydraulically-powered devices are further undesirable because the magnitude of force which they can develop is also restricted by the available mounting space for the device. Even if space is available for mounting a hydraulic tensioning device, in order to impart even moderate tensile stresses to a shank of a large-diameter bolt, or the like, it is typically necessary to develop and maintain hydraulic pressure of about 15,000 psi, which is near the maximum hydraulic pressure attainable by even large-scale industrial equipment and extremely taxing on the hydraulic seals and pressurizing equipment. Yet such pressures are still entirely inadequate for tensioning of a large-diameter metallic shank to a level of stress approaching its elastic limit. Examples of such hydraulic tensioning devices can be found in U.S. Pat. Nos. 3,835,523; 3,841,193; 3,886,707; 4,075,923 and 4,182,215.

Mechanically-operated apparatus such as multiple jack bolt apparatus, particularly, that disclosed in my prior U.S. Reissue Pat. No. 33490, the disclosure of which is incorporated herein by reference, are effective means for applying extremely high tensile stresses to shanks of fasteners. As will become apparent from the instant invention disclosure, it is to such multiple jack bolt tensioning apparatus that the present invention represents a significant improvement.

Multiple jack bolt tensioning apparatus such as that of my prior U.S. Reissue Pat. No. 33490 have been used successfully in most applications where large clamping or tension forces are required There is no difficulty in assembling the bolting systems, or in creating clamping forces of millions of pounds by using very hard jack bolts with the proper lubricants. Moreover, under normal room temperature conditions, there is also no problem in disassembling multiple jack bolt bolting systems by simply unscrewing the jack bolts in established patterns.

However, problems in the disassembly of multiple jack bolt bolting systems can develop if the lubricant used during assembly of the system has broken down or disappeared. The breakdown and disappearance of the lubricant occurs mostly by prolonged exposure of the bolting system to oxidation or corrosion or by exposure to extreme heat. Multiple jack bolt tensioners of the type under discussion have been used for temperatures above 1300 degrees F. (690 degrees C). Petroleum lubricants typically break down above 150 degrees C. and virtually all other lubricants including molybdenum disulphate, graphite and nickel powder lubricants lose their lubricity below 750 degrees F. (400 degrees C.). For example if ½" (12.7 mm) jack bolts are tightened at 100 ft. lb. (135 N-m), it takes only 90 ft-lb (122 N-m) to loosen them as long as the original lubricant is intact. If, however, the bolting system is heated to 1000 degrees F. (538 degrees C.) it takes 120 to 200 ft-lb (163 to 271 N-m) to break the jack bolts loose depending on the lubricant that was used. Near the high end of the "break loose" torque, the jack bolts may twist off before they break loose. The same thing can happen when a multiple jack bolt tensioner has been exposed to corrosive or other forces that have destroyed the lubricant used during the assembly operation.

The aforementioned U.S. Pat. No. 4,182,215 discloses a hydraulic system for releasing a bolt tensioner apparatus. However, for reasons noted hereinabove, such apparatus is entirely useless in extremely high temperature environments.

A further disadvantage caused by usage of multiple jack bolt tensioning apparatus in high temperature and corrosive environments is that the tremendous point loads exerted by the thrust ends or tips of the jack bolts often cause permanent deformation of the structural flange, thrust washer, and the like, against which they are compressively abutted.

An advantage exists, therefore, for simple and inexpensive method and apparatus for ensuring disassembly of multiple jack bolt bolting systems, particularly systems whose jack bolt lubricant has broken down or been lost due to exposure to extreme heat and/or prolonged oxidation or corrosion.

A further advantage exists for a means to prevent permanent deformation of structural flanges, thrust washers, and the like, caused by extreme point loads exerted by the thrust tips of the jack bolts of a multiple jack bolt tensioning systems, particularly in systems exposed to high temperature and/or corrosive atmosphere.

It is, therefore, an object of the present invention to provide a simple and inexpensive method and apparatus for ensuring disassembly of multiple jack bolt bolting system, particularly systems whose jack bolt lubricant has broken down or disappeared due to exposure to extreme heat and/or prolonged oxidation or corrosion.

It is a further object of the present invention to provide means to prevent permanent deformation of structural flanges, thrust washers, and the like, caused by extreme point loads exerted by the thrust tips of the jack bolts of a multiple jack bolt tensioning systems, particularly in systems exposed to high temperature and/or corrosive atmosphere.

Still other objects and advantages will become apparent in light of the attached drawings and written description of the invention presented hereinbelow.

SUMMARY OF THE INVENTION

In order to overcome the problem of seizure of multiple jack bolt tensioning devices arising from jack bolt lubricant break down or loss caused by exposure of the devices to extreme heat and/or prolonged oxidation or corrosion, there is provided a multiple jack bolt assembly wherein a tensioner body component of the assembly, which may take the form of a nut, bolt, thrust collar, and the like, is provided in addition to its plurality of standard jack bolt holes with at least one additional drilled and tapped release hole for receiving a corresponding number of release jack bolts. The additional jack bolt hole or holes preferably remain empty during both installation and the load cycle of the jack bolting system and it is also preferred that they and the release jack bolts received therein vary in configuration from the standard jack bolt holes and jack bolts. When it is desired to remove the multiple jack bolt tensioning device, the release jack bolt holes are first cleaned (if necessary) and lubricated. The release jack bolts are then lubricated, threaded into the release jack bolt holes until their thrust ends contact a hardened washer member, which is also contacted by the thrust ends of the plurality of standard jack bolts, and are then torqued to an amount at least equal to the installation torque of the immediately adjacent standard jack bolts, thereby relieving the compressive loads thereof. With the release jack bolts in this position, the adjacent jack bolts are broken loose, as well as the remaining standard jack bolts, if possible, whereupon the tensioner body component may be removed.

If, however, the remaining jack bolts are still too tight, the loosened jack bolts immediately adjacent the release jack bolts are removed, lubricated, rethreaded into their original holes, and torqued to their original values. This will relieve the load on still other jack bolts that are adjacent the newly-lubricated and reinserted jack bolts whereby they may also then be broken loose. The process of removing, lubricating, reinserting, and torquing the already loosened jack bolts is repeated as often as necessary until the load on all of the jack bolts, including the release jack bolts, is relieved, thereby enabling removal of the tensioner body component.

DETAILED DESCRIPTION OF THE PREFERRED EMBODIMENTS

Figure 1:
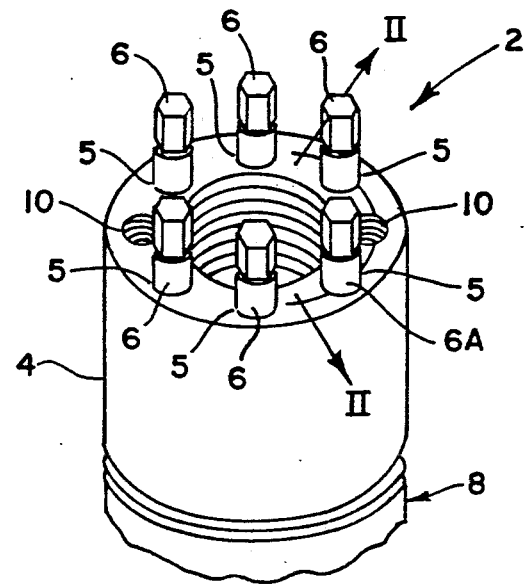
FIG. 1 is a perspective view of a first embodiment of the multiple jack bolt fastener apparatus according to the present invention.

In accordance with the present invention, there is disclosed in FIG. 1 a multiple jack bolt tensioning fastener apparatus 2 including a tensioner body component 4 which functions as a stress generating flange. Although depicted as a thrust collar, tensioner body component 4 may also assume the configuration of a nut, a bolt, or the like. The tensioner body is most preferably formed of a tough but ductile material, such as, for example, 100,000 psi (6900 bar) steel. For high-temperature applications it may be an austenitic stainless steel or when used in corrosive seawater environments it may be a naval bronze.

Threadedly received in drilled and tapped holes 5 in tensioner body component 4 are a first set of wrenchable jack bolt fasteners 6. As will perhaps be better appreciated from a description of a practical application of the present invention provided hereinbelow in regard to FIGS. 2A and 2B, it is the degree to which the jack bolts 6 are torqued which determines the tensile force applied to a shank of a shaft held by tensioner body 4. Because the jack bolt thread area is so small, i.e., usually only about one-third the area of the threading of the shaft being tensioned, the jack bolts 6 must be made from a very hard material. For lower temperature service they may be made from a hardened alloy steel and for high-temperature service they are preferably made from a high nickel alloy. Certain nickel alloys are also suitable for corrosive and seawater service.

Figure 6:
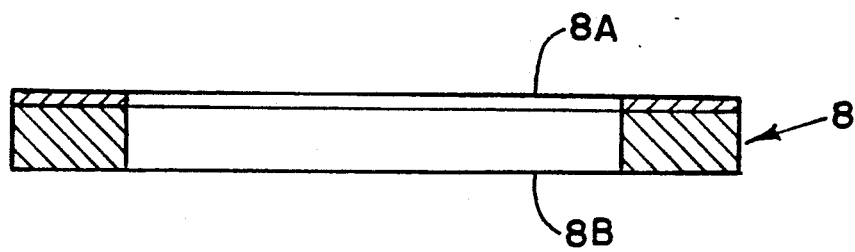
FIG. 6 is an enlarged sectional view of a hardened composite thrust ring adapted for engagement by the thrust ends of the jack bolts of the present invention.

A third major component of the multiple jack bolt apparatus 2 of the present invention is a hardened composite thrust washer 8, whose structure and function will be explained in detail in reference to the description of FIG. 6 presented hereinbelow.

In the assembly of the multiple jack bolt fastener 2 depicted in FIG. 1, the shank of a threaded fastener (not illustrated) is passed through an opening or aligned openings of shoulder members, flange members, or the like, provided in a support structure, thus establishing a mechanically free relationship between the shank and the support structure throughout the length of the shank, in such manner that a threaded end of the threaded fastener protrudes outwardly of the support structure. Hence, as should be appreciated, the opposite end of the threaded fastener functions as an anchor flange. The hardened composite washer 8 is then positioned about the protruding threaded end of the threaded fastener, then the internally threaded thrust collar tensioner body 2 is threaded onto the threaded fastener. Each of the exposed head portions of the jack bolts 6, although illustrated as being configured so as to be received by a socket of a wrenching tool may also be suitably formed so as to receive a wrenching tool, is then turned to the desired torque value by a torque wrench, or the like, such that the thrust ends of the jack bolts compressively abut the hardened thrust washer 8, thereby imparting to the threaded fastener the desired degree of tensile force. These basic steps of installation are also performed and described in somewhat greater detail in my prior U.S. Reissue Pat. No. 33490.

As mentioned hereinabove, during the load cycle of a multiple jack bolt apparatus such as apparatus 2 described herein, the jack bolts 6 may seize due to loss or breakdown of their installation lubricant as a result of exposure to extreme heat and/or prolonged exposure to a corrosive atmosphere. Consequently, damage to the jack bolts 6 and/or the tools which are required to unscrew them may result should removal of the multiple jack bolt apparatus be attempted. The method and apparatus in accordance with the instant invention provides an effective solution to this problem.

Figures 2, 3:
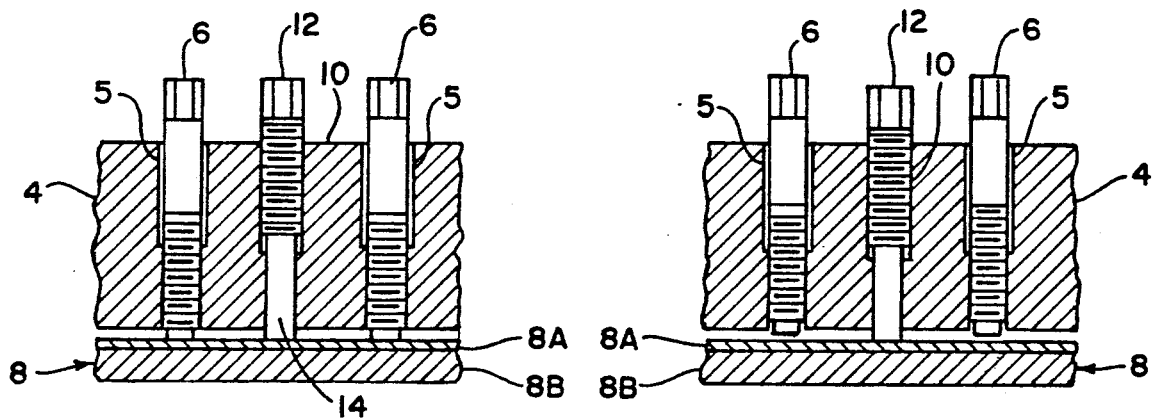
FIG. 2 is a laid-flat sectional view taken along line II—II of FIG. 1 including the addition of a release jack bolt for purposes of illustration.
FIG. 3 is a view similar to FIG. 2 depicting the release jack bolt in a torqued-down position.

Referring still to FIG. 1 and now also to FIGS. 2 and 3, it is seen that along with the holes which are provided for receiving jack bolts 6, the tensioner body component 2 of the present invention is also provided with at least one or, preferably, at least a pair of diametrically opposed drilled and tapped release holes 10 for receiving of second set of "release" jack bolts 12. In the preferred embodiment of the present invention, the jack bolt holes 5 and the working jack bolts 6 are provided with mating threading at at least the thrust ends thereof, whereas the release jack bolt holes 10 and the release jack bolts 12 received therein are provided with mating threading only at the wrenching ends thereof. Consequently, the thrust ends of each of the release jack bolts 12 are formed by a reduced diameter unthreaded pintle 14 which is slidably received in a reduced diameter unthreaded thrust end portion of a respective release jack bolt hole 10. Also, if a plurality of release jack bolt holes 10 are provided, they need not be diametrically opposed, however such a disposition is believed to provide the best arrangement for both jacking and releasing operations.

For high temperature service, it has been discovered to be best to use jack bolts 6 that are threaded essentially entirely to their thrust ends so that creep on these ends is kept to a minimum. Whereas, for release jack bolts 12 there is no threat of creep because the multiple jack bolt assembly is cold during the removal operation. Furthermore, a pintle type bolt is better suited for the release jack bolt 12 because the long pintle 14 adds elasticity to the exposed end of the release jack bolt. Added load on the release jack bolt 12, resulting from the unloading of the adjacent working jack bolts 6, results in added compression in the pintle 14 of the release jack bolt 12. And, the longer the pintle, the less the stress in the pintle from a given amount of compressive length change in the pintle.

A major advantage of using one type of jack bolt for the working jack bolts 6 and another type for the removal or release jack bolts 12 is that the jack bolt holes 10 designated for removal jack bolts 12 cannot accidentally be filled with working jack bolts 6 upon assembly or installation of the apparatus 2. The working jack bolts 6 simply will not fit into the removal holes 10, hence installation errors by inexperienced persons are avoided.

During both installation and throughout the life of the load cycle of the multiple jack bolt apparatus 2 of the present invention, it is preferred that the release jack bolt holes 10 remain unoccupied. It is contemplated, however, that holes 10 may be filled with heat and/or corrosion resistant material, such as, for example, a ceramic cap which can be removed without great effort when it is desired to release apparatus 2 from its loaded condition.

According to the present invention, performance of the following procedure will permit effective, quick and nondestructive removal of the multiple jack bolt apparatus 2 if the jack bolts 6 have seized due to loss or breakdown of their installation lubricant.

Initially, if there is dirt or other obstructions in the release jack bolt holes 10, then an appropriate tap can be run through the holes to clean them. Once cleaned, the holes 10 are lubricated. The release jack bolts 12 are then lubricated and threaded into the release jack bolt holes 10 until their thrust ends contact the hardened thrust washer 8 as shown in FIG. 2. The release jack bolts are then torqued to an amount equal to or greater than the installation torque value of the immediately adjacent jack bolts 6, thereby relieving the loads thereof. This situation will be appreciated with reference to FIG. 3 wherein the thrust ends of the jack bolts 6 are displayed, for purposes of illustration, at an exaggerated spacing from hardened thrust washer 8 due to the "over-torquing" of the release jack bolt 12 which, in this position, acts somewhat like a stilt-type support member. It should be understood, however, that the thrust ends of the immediately adjacent jack bolts 6 do not necessarily have to be caused to become spaced from the thrust washer 8 by the over-torqued release jack bolts 12 in order to have their compressive loads sufficiently reduced such that they can be relatively easily broken loose.

While the release jack bolts 12 remain in the "over-torque" position, the adjacent jack bolts 6 are broken loose as well as the remaining jack bolts 6, if possible, whereupon the tensioner body component 2 may be removed.

If, however, the remaining jack bolts 6 are still too tight, the loosened jack bolts 6 immediately adjacent the release jack bolts 12 are removed, lubricated, rethreaded into their original holes, and torqued to their original values. This will relieve the load on still other jack bolts that are adjacent the newly-lubricated and reinserted jack bolts whereby they may also then be broken loose. The process of removing, lubricating, reinserting, and torquing the already loosened jack bolts 6 is repeated as often as necessary until the load on all of the jack bolts, including the release jack bolts 12, is relieved, thereby enabling removal of the tensioner body component 2.

As evidence that performance of the above-described method effectively serves to enable a workman to easily remove seized multiple jack bolt tensioning assemblies, tests have shown that ½ inch (12.7 mm) jack bolts, i.e., jack bolts 6, that are tightened at installation to 100 ft-lb (135 N-m) while coated with a graphite oil lubricant will break loose at 90 ft-lb (122 N-m) immediately after tightening. Whereas, after the assembly was heated to 1000 degrees F. (538 degrees C.) for 100 hours it took 160 ft-lb (216 N-m) to break the jack bolts 6 loose. When freshly lubricated release jack bolts 12 were inserted in the lubricated release jack bolt holes 12 and tightened to 100 ft-lb (135 N-m), the adjacent jack bolts 6 that previously required 160 ft-lb (217 N-m) broke loose at 40 ft-lb (30 N-m). When the broken loose adjacent jack bolts 6 were removed, re-lubricated and re-tightened, all other jack bolts 6 broke loose at less than 40 ft-lb (30 N-m). The release jack bolts 12 and the relubricated adjacent jack bolts 6 could then be removed at less than 100 ft-lb torque. The removal method thus described therefore removes a major stumbling block in using multiple jack bolt tensioners in high-temperature and in corrosive services.

Typical corrosive and/or high temperature industrial installations in which the present invention finds particularly beneficial usage, wherein the term "high temperature" may suitably refer to environments having a working temperature between about 800° F. -1200° F. and sometimes as high as 1350° F., include chemical reaction chambers, refining equipment, steam generator turbines, and valve and pipe connections, among others. A practical example of a flanged pipe connection employing the improved multiple jack bolt system of the present invention is shown in FIGS. 4A and 4B.

Figure 4B:
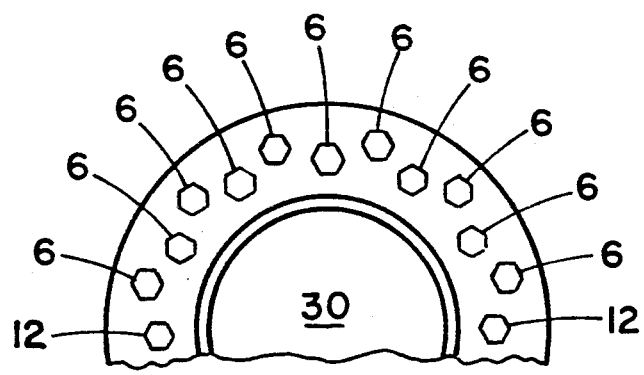
FIG. 4A and 4B are sectional longitudinal and end views, respectively, of another embodiment of the multiple jack bolt apparatus according to the present invention.
Figure 4A:
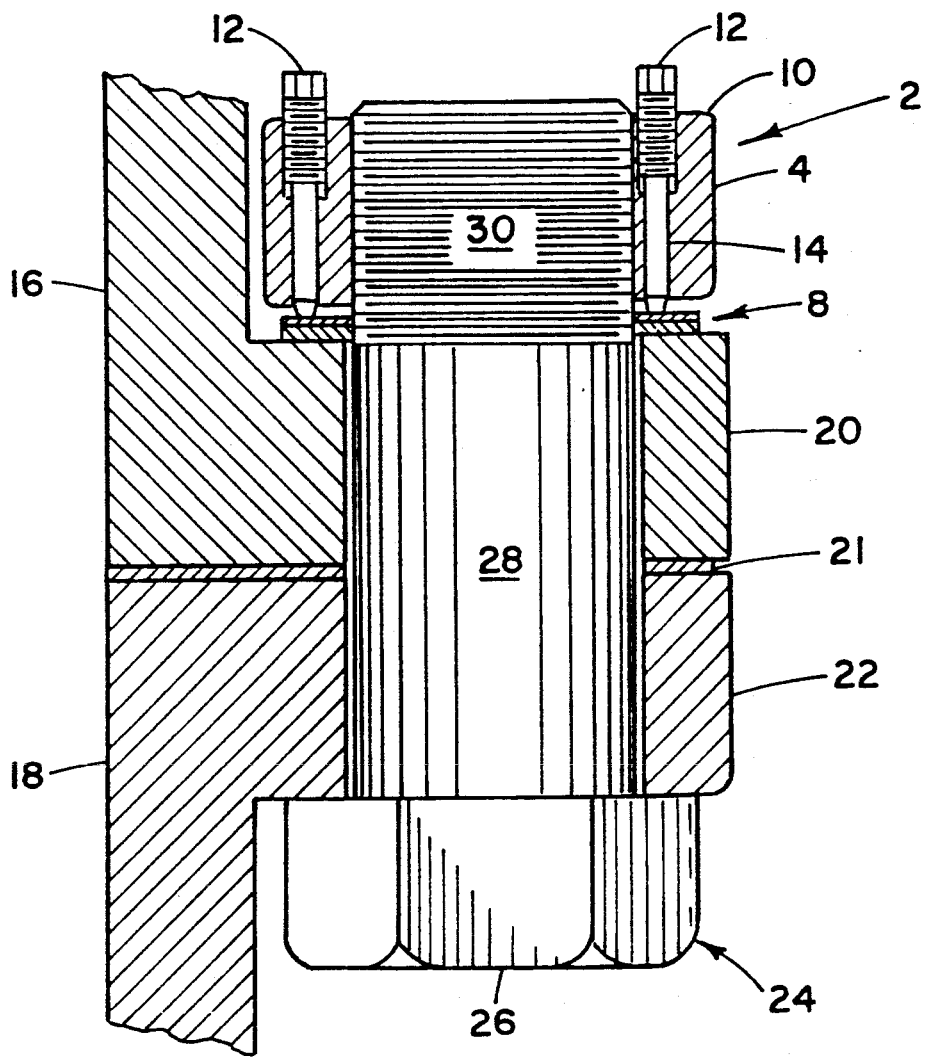

In FIGS. 4A and 4B, there is illustrated a fastener embodying the features of the present invention for forming part of a high-pressure pipe flange assembly which includes two pipe members 16 and 18 having pipe flanges 20 and 22, between which is clamped a gasket 21. The fastener is shown in a position similar to FIG. 2 wherein the release jack bolts 12 have been fully inserted into release jack bolt holes 10 but just prior to the torquing of the release jack bolts.

A plurality of fastener assemblies 24 are received in suitable openings which are spaced in two concentric circular ring patterns about the outer peripheries of the pipe flanges 20 and 22. Each fastener assembly 24 includes a bolt member having a head portion 26 which functions as an anchor flange, a shank portion 28 and a threaded end portion 30. The threaded end portion is engaged with a tensioner body component 4 in the form of a nut member. The nut member functions as a flange and includes a plurality of drilled and tapped jack bolt holes 5 and release jack bolt holes 10, only holes 10 being shown, which are spaced in two concentric rings about a bolt circle located between the outer edge of the nut and the threaded bore. Either a "standard" jack bolt 6 or a release jack bolt 12 is received in each of the drilled and tapped holes 5 and 10 in the nut. Depending upon the size and nature of the shaft tensioning application, it is possible that greater than two concentric rings of jack bolts holes may be provided in tensioner body component 4. Each of the jack bolt holes 6 and release jack bolt holes 10 present a thrust end portion extending into compressive engagement with a support surface provided by hardened thrust washer 8. The length of the jack bolts 6 and release jack bolts 12 must be sufficient so that their threaded shanks can be advanced along the tapped holes 5 or 10 until a desired torque is established. It will be understood that the nut member 4 can be rotated on the threaded end portion 30 to either contact or form a small gap between the nut member and the support surface of hardened thrust washer 8.

From the foregoing, it will be appreciated that in order to remove the multiple bolt tensioner apparatus 2, the lubricated release jack bolts 12 are torqued to an amount equal to or greater than jack bolts 6 and the tensile load relieving process progresses as described supra.

Figure 5B:
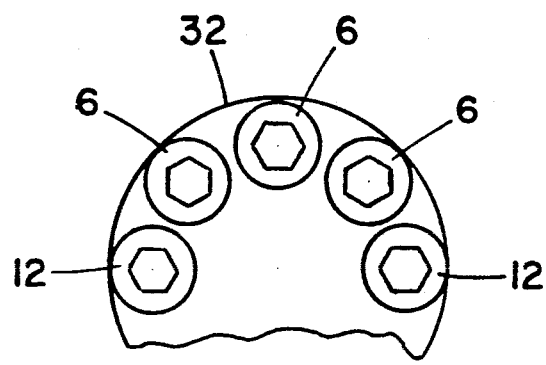
FIG. 5A and B are views similar to FIGS. 4A and 4B of another embodiment of the multiple jack bolt apparatus of the present invention.
Figure 5A:
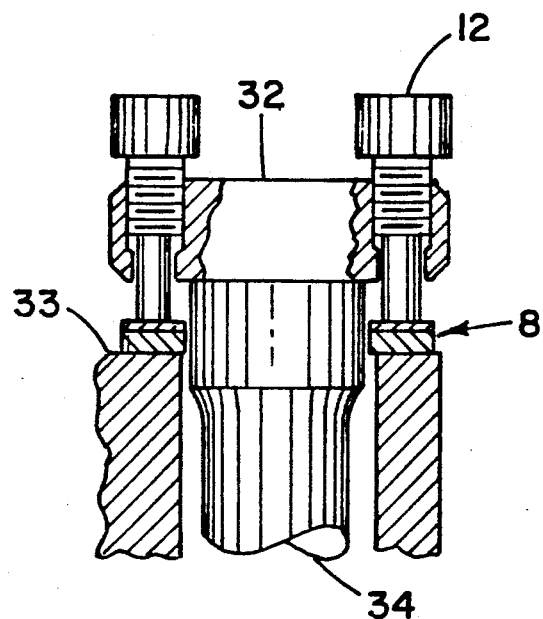

In FIGS. 5A and 5B, a third embodiment of the fastener assembly according to the present invention is illustrated which differs from those already described by the fact that jack bolts 6 and release jack bolts 12 are engaged in threaded openings spaced about a bolt circle in the head portion of a conventional bolt 32. The bolt shown in FIG. 5A forms part of an anchor for a machine element 33. A shank portion 34 of the bolt member extends through an opening in the machine element and projects into a foundation there it is anchored in a suitable, well-known manner. As shown in FIG. 5B, the jack bolts and release jack bolts are embodied as socket-head cap screws having socket portions at their ends projecting from the head of the fastener. The opposite ends of the jack bolts engage with the hardened steel thrust washer 8 described herebelow.

Turning to FIG. 6 there is seen an enlarged sectional view of the third major component, i.e., the composite hardened thrust washer 8, of the multiple jack bolt tensioning fastener apparatus 2 of the present invention.

Heretofore, as disclosed in my prior U.S. Reissue Pat. No. , a ring member formed of hardened alloy steel was used to receive the compressive loads of the thrust ends of the jack bolts in a multiple jack bolt apparatus. However, hardened alloy steels were found to be unsuitable materials for withstanding the abuse of high temperature and/or corrosive service.

In normal (approximately room temperature) situations, standard hardened thrust washers are usually from ¼" to ¾" thick and they perform well if their hardness is approximately 10 points lower on the Rockwell C scale than the jack bolts. However, it has been discovered that the jack bolts penetrate the hardened washers if the hardness differential is much more than 10 Rockwell C scale points or if the working temperature becomes extreme. Furthermore, the penetration into the hardened washers is very localized and permanently deforms the washers. This can be explained by the fact that as the material under the jack bolt thrust tip is being compressed, the washer material around the jack bolt thrust tip acts like a cylinder containing a fluid (the fluid being the soft metal under the jack bolt point).

It has been discovered through the present invention that by overlaying a relatively thick washer layer with a layer of thin but very hard material which receives direct contact by the ends of the jack bolts 6 and release jack bolts 12, the hydraulic action is contained by a much larger area, and there is virtually no permanent penetration. Thus, it is seen from FIG. 5 that the preferred improved hardened thrust washer of the present invention comprises a hard yet thin overlay washer layer or ring 8A secured to a thicker yet softer hardened washer layer or ring 8B.

The actual construction and dimensions of the washer 8 depend upon the intended loading conditions experienced thereby, which are a function of both jack bolt size and torque. As evidence of the ruggedness of the preferred construction of the composite thrust washer 8 of the present invention, it has been discovered that a thin hard overlay washer layer 8A made from high nickel content alloy ranging from 0.050" to 0.100" (1.3 to 2.6 mm) thickness laid over a thick thrust washer layer 8B of ¼" to ¾" (6 mm to 20 mm) thickness formed from a relatively softer austenitic stainless steel and loaded by hardened nickel alloy jack bolts to 150,000 psi (10300 bar) stress showed no noticeable penetration even after heating to 1000° F. (550° C.). High nickel content overlay washer layers 8A of 0.050" to 0.100" (1.3 to 2.6 mm) can be easily cut from high nickel content sheet and welded to hardened yet relatively softer and much cheaper washer layers 8B for an effective and economical solution to the special washer problems encountered in high temperature and corrosive service. It is also possible, among other techniques known in the art, to apply the desired thickness of hardened overlay washer layer 8A onto the thick washer layer 8B by metallized spray.

It is also conceivable that the hardened thrust washers 8 of the present invention could be formed exclusively of high nickel content alloys. However, such a construction is not preferred since washers formed of high nickel content alloys are almost impossible to obtain for the large sizes which are required, their materials are prohibitively expensive, and they are quite difficult to fabricate.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

I claim:

1. A method for loosening seized jack bolts threadedly engaged in a stress generating flange of a multiple jack bolt apparatus for tensioning a shaft, said method comprising the steps of:

(a) torquing a plurality of jack bolts threadedly engaged in all but at least one jack bolt receiving hole provided in said stress generating flange, thereby tensioning said shaft and allowing access to said at least one jack bolt receiving hole while in continuous non-use until it is desired to relax the tension treated on said shaft by said torquing of said plurality of jack bolts;

(b) lubricating at least one release jack bolt;

(c) threading said at least one release jack bolt into said at least one free jack bolt receiving hole;

(d) torquing said at least one release jack bolt into said at least one free jack bolt receiving hole adjacent to said seized jack bolts threadedly engaged in said flange to a torque at least as great as an original compressive force generating installation torque applied to said seized jack bolts thereby loosening compressive stress in said seized jack bolts; and (e) applying to ones of said seized jack bolts adjacent said at least one release jack bolt a reverse torque less than said original compressive force generating installation torque thereby loosening said seized jack bolts adjacent said at least one release jack bolt.

2. The method according to claim 1 further comprising the steps of:

(f) removing the loosened jack bolts adjacent said at least one release jack bolt;

(g) lubricating the removed jack bolts;

(h) reinserting the lubricated jack bolts into holes in said stress generating flange from which they were removed;

(i) retorquing the reinserted jack bolts to their original compressive force generating installation torque; and (j) applying to ones of said seized jack bolts adjacent the reinserted jack bolts a reverse torque less than said original compressive force generating installation torque in order to loosen said seized jack bolts adjacent to said reinserted jack bolts.

3. The method of claim 2 further comprising the steps of:

(k) removing the loosened jack bolts adjacent the reinserted jack bolts;

(l) repeating steps (g) through (j) until all of the seized jack bolts have been loosened; and (m) applying to said at least one release jack bolt and any remaining reinserted and retorqued jack bolts a reverse torque less than said original compressive force generating installation torque in order to loosen said at least one release jack bolt and any remaining reinserted and retorqued jack bolts.

4. The method of claim 3 further comprising, prior to step (a), cleaning and lubricating said at least one free jack bolt receiving hole.

* * * * *